United States Patent [19]

Howard et al.

[11] 3,710,385
[45] Jan. 9, 1973

[54] VEHICLE INITIAL SPEED AND STOPPING DISTANCE INDICATOR

[75] Inventors: Donald W. Howard; Dewey W. Eppley; Hugh D. Steininger, all of South Bend, Ind.

[73] Assignee: The Bendix Corporation, South Bend, Ind.

[22] Filed: Sept. 29, 1970

[21] Appl. No.: 76,408

[52] U.S. Cl....................................343/9, 343/8
[51] Int. Cl.............................................G01s 9/46
[58] Field of Search...........................343/8, 9

[56] References Cited

UNITED STATES PATENTS

| | | | |
|---|---|---|---|
| 2,804,160 | 8/1957 | Rashid | 343/8 X |
| 3,448,822 | 6/1969 | La Lone et al. | 343/8 |
| 3,383,682 | 5/1968 | Stephens, Jr. | 343/8 X |
| 3,394,373 | 7/1968 | Makrancy | 343/8 |

Primary Examiner—Malcolm F. Hubler
Attorney—William N. Antonis and Plante, Hartz, Smith and Thompson

[57] ABSTRACT

A system utilizing Doppler radar for indication of vehicle speed at the time of a brake application and the stopping distance for that particular brake application. The output from the Doppler radar is a frequency that is directly related to the velocity of the vehicle with respect to ground. By the proper selection of the other constants, a given number of Hertz can correspond to a given velocity. Counting all the cycles from initial brake application until stopped and dividing by the appropriate value will give the total stopping distance. Dual counters that alternately record a velocity signal are applied. Light emitting diodes provide a visual readout of velocity and stopping distance.

4 Claims, 4 Drawing Figures

INVENTORS
HUGH D. STEININGER
DONALD W. HOWARD
& DEWEY W. EPPLEY

ATTORNEYS

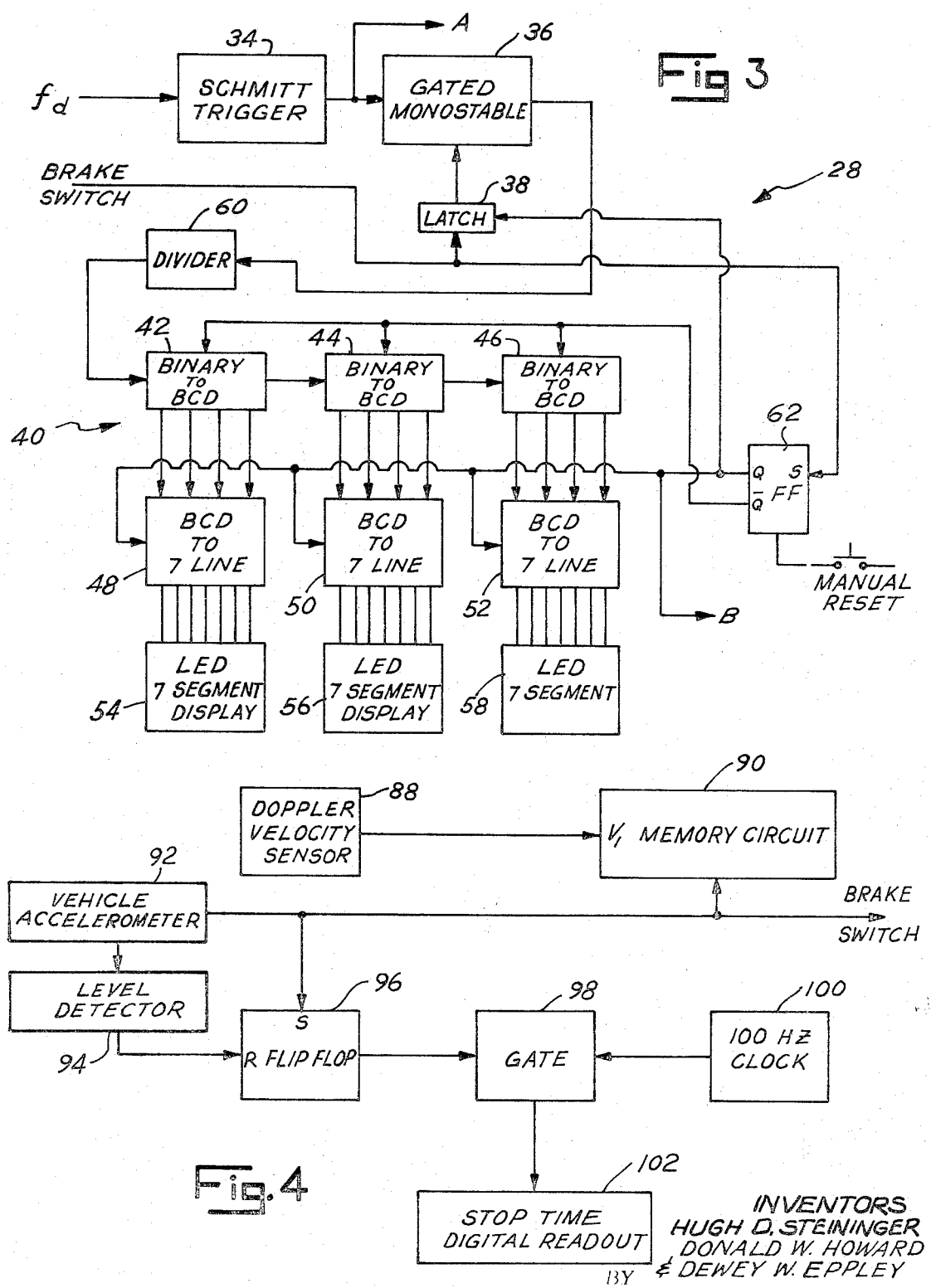

VEHICLE INITIAL SPEED AND STOPPING DISTANCE INDICATOR

BACKGROUND OF THE INVENTION

Prior to this invention, to monitor a brake stop of an automotive vehicle a fifth wheel had to be attached to the vehicle. The fifth wheel would measure the initial velocity and the total distance required for a single brake application. The fifth wheel, which was normally attached to the rear bumper of an automotive vehicle, had to be held into constant contact with the road surface. On a rough surface or a gravel road, the fifth wheel may lose contact with the road surface and cause errors in the total stopping distance or the initial velocity. Also, since the circumference of the fifth wheel could vary according to air pressure, the initial velocity or total stopping distance could have possible errors due to this change in circumference. The fifth wheel is bulky and not easily transferable between different automotive vehicles.

SUMMARY OF THE INVENTION

It is an object of this invention to provide a system utilizing Doppler radar for the indication of vehicle speed at the time of brake application and the total stopping distance for that particular brake application.

It is another object of this invention to provide a vehicle initial speed and stopping distance indicator that is not dependent upon road surface conditions or surface contact.

It is an even further object of this invention to provide a vehicle initial speed and stopping distance indicator that has a small physical size to permit ease of transportation and, at the same time, ease of installation or change-over from one vehicle to another vehicle.

It is an even further object of this invention to provide a vehicle initial speed and stopping distance indicator utilizing a Doppler radar. The output from the Doppler radar is converted into an appropriate number of Hertz per feet per second. Once the output is in the proper units, it is continuously fed into a velocity indication portion of the circuit and a stopping distance indicator. Upon receiving a signal that indicates a brake application, the velocity indicator immediately retains that particular velocity while the stopping distance indicator accumulates pulses that represent the total stopping distance of the automotive vehicle.

It is another object of this invention to provide a stopping distance indicator utilizing a Doppler radar that is not dependent upon the change in angle between the Doppler radar beam and the ground surface as a result of high deceleration braking stops.

BRIEF DESCRIPTION OF THE DRAWINGS

FIG. 3 is an illustrative block diagram of a stopping distance indicator portion of FIG. 1.

FIG. 4 is an illustrative block diagram of an alternative embodiment to obtain the stopping time during a braking application and thereby calculate stopping distance using the parameter of initial speed and time.

DESCRIPTION OF THE PREFERRED EMBODIMENT

Figure 1:
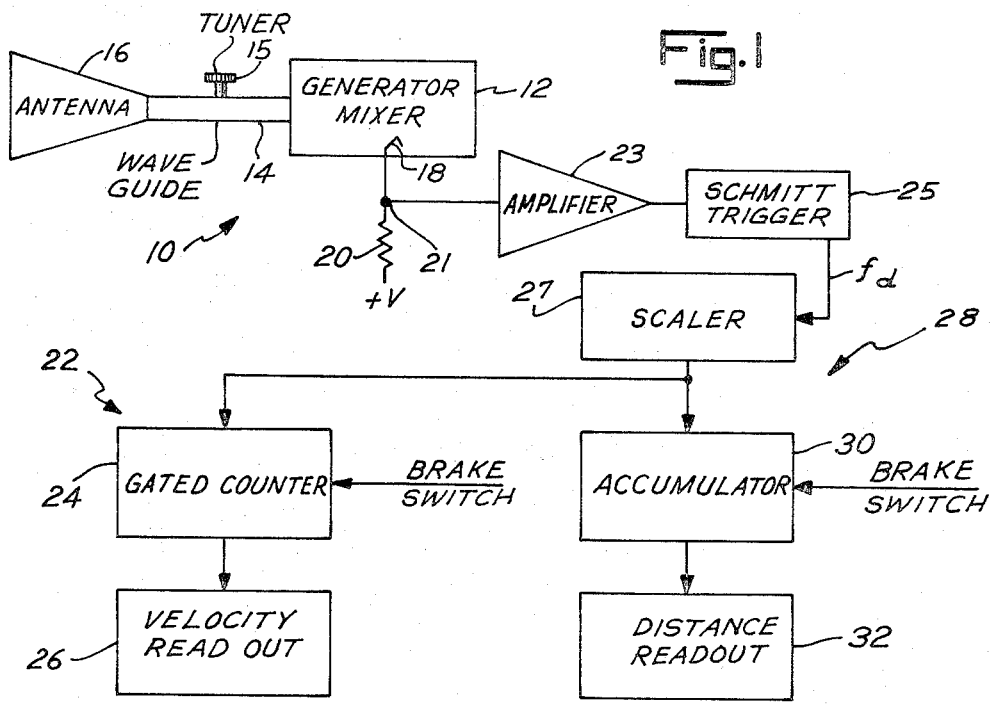
FIG. 1 is a functional block diagram of a Doppler radar unit used to give initial velocity and stopping distance during a brake application.

Referring to FIG. 1 of the drawings, a Doppler radar unit is represented generally by the reference numeral 10. The Doppler radar unit 10 comprises high frequency energy continuously generated in the generator mixer cavity 12 by means of either an avalanche diode or a Gunn device. The energy generated in the cavity 12 is coupled through waveguide 14 to the radiating antenna 16. Upon transmitting the energy and striking another object, normally the road surface, the transmitted signal is reflected back to antenna 16. The reflected signal is shifted by an amount proportional to the relative velocity between the radiating antenna 16 and the reflecting object. If the antenna is directed toward the road surface at a predetermined angle $\theta$, then the shift will be proportional to the linear velocity of a vehicle on which the antenna is mounted. The shift or Doppler frequency is related to vehicle velocity by the equation:

1. $f_d = (2V \cos \theta)/(\lambda)$ where $f_d$ is the Doppler shift in Hertz, $V$ is the vehicle velocity, $\lambda$ is a constant, and $\theta$ is the angle between the road surface and the incidence of the transmitted radar beam from the antenna 16.

The reflected signal is received by the radiating antenna 16 and coupled through the waveguide 14 to the generator mixer 12. The difference frequency between the transmitted and reflected signals, commonly known as the Doppler frequency, is extracted by coupler 18 which is connected through resistance 20 to a voltage source +V. The node 21 of coupler 18 that is connected to resistance 20 also feeds high gain amplifier 23 followed by a Schmitt trigger 25 to provide a square wave output that has a frequency equal to the Doppler frequency.

The generator mixer 12 simultaneously performs the signal generating and mixing functions. Also, the generator mixer 12 acts as a low pass filter which eliminates all but the difference, or Doppler frequency, at node 21. An example of a Doppler radar unit similar to the one just described can be found in U.S. Pat. application, Ser. No. 42,651, filed on June 2, 1970, having a common assignee as the present invention.

A tuner 15 is incorporated in the waveguide 14. The tuner is adjusted to provide the maximum amplitude for the Doppler frequency received at node 21 and, consequently, from amplifier 23. This adjustment of the tuner does not necessarily coincide with the maximum power transfer or the maximum power for the Gunn device.

By selecting the voltage source +V and adjusting the angle $\theta$, the Doppler frequency can be made directly proportional to the vehicle velocity in terms of appropriate engineering units. A scaler 27 may be necessary to convert the Doppler frequency $f_d$ into different engineering units. Assume, for example, that the Doppler frequency $f_d$ is equal to 20 Hertz per foot per second. By using a larger frequency and dividing to the desired frequency, an increased resolution at low vehicle velocities can be obtained. Also, the mounting location of the Doppler radar unit 10 could be on the side of the vehicle in line with the center of gravity to minimize error from angular changes resulting from braking.

The output from the scaler 27 is fed into the initial speed indication portion 22 of FIG. 1. The initial speed indication portion 22 comprises a gated counter 24 that continuously gives the velocity of the vehicle. Upon receiving a command from the brake switch, the gated counter retains that particular velocity and feeds an output into velocity readout 26. The velocity readout 26 corresponds to the velocity of the automotive vehicle upon receiving a command from the brake switch in the initial speed indication portion 22.

The output from the scaler 27 is also fed into a stopping distance indicator portion 28 of FIG. 1. In the stopping distance indicator 28, an accumulator 30 begins receiving signals from the scaler 27 upon a command from the brake switch. For the brake application, the accumulator 30 continuously receives signals from the scaler 27 until the vehicle has come to a complete stop, or the brake pedal has been released. The signals contained in accumulator 30 represent the total stopping distance of the vehicle. An output of accumulator 30 is fed into distance readout 32 that gives a visual indication as to the total stopping distance.

Referring now to FIG. 3 of the drawings, the Doppler frequency $f_d$ is fed into Schmitt trigger 34 to give a good square wave signal. The output of the Schmitt trigger, represented generally by letter A, operates a gated monostable 36. Upon receiving a command from the brake switch, latch 38 allows gated monostable 36 to pass the signals received from Schmitt trigger 34. The output from the gated monostable 36 is fed into a series shift register 40. The series shift register 40 is composed of three binary-coded-decimal (BCD) converters 42, 44 and 46. The signals from the gated monostable 36 initially feeds into binary-coded-decimal (BCD) converter 42. Upon filling BCD converter 42, a pulse is fed into BCD 44 in a series manner. Likewise, upon filling BCD converter 44, a pulse is fed into BCD converter 46. This may be carried through as many series converters as would be needed for any stopping distance possible. However, for the purposes of illustration, this invention only shows a three digit readout in the stopping distance indicator portion 28. The outputs of BCD converters 42, 44 and 46 are fed into BCD to seven line decoders 48, 50 and 52, respectively. The outputs from the BCD to seven line decoders 48, 50 and 52 operate light emitting diodes (LED) 54, 56 and 58, respectively. The LED display as used in this invention is more fully described in U.S. Pat. application, Ser. No. 887,016, filed on Dec. 22, 1969, having a common assignee with the present invention. Though the present invention uses LED with the seven segment display as described in the previously mentioned application, it is equally feasible to use other types of visual indication that will give the total vehicle stopping distance during a single brake application.

If the Doppler frequency $f_d$ that feeds through Schmitt trigger 34 and gated monostable 36 is not of the desired frequency, a divider 60 can be used to reduce the frequency $f_d$ to a given frequency. It is desirable that Doppler frequency $f_d$ be of such a frequency that it may be easily divided in divider 60 whereby a given number of cycles will indicate a given distance per second. After the vehicle has stopped, and the stopping distance has been obtained, the logic in the converters 42, 44 and 46 and decoders 48, 50 and 52 can be reset by pushing the manual reset button. The manual reset button resets flip-flop 62. The output from flip-flop 62, when in the set condition, will allow the BCD to seven line segment decoders 48, 50 and 52 to receive signals from the BCD converters 42, 44 and 46, respectively. Also, the output of flip-flop 62, when in the reset condition, controls latch 38 so that no signals are received from the gated monostable 36 until the brake switch has set flip-flop 62. Now upon reset of flip-flop 62 by the manual reset, the latch 38 inhibits gated monostable 36, and decoders 48, 50 and 52 are inhibited by the loss of the set output of flip-flop 62. Converters 42, 44 and 46 are reset by the reset output of flip-flop 62. The output of reset flip-flop 62, when in the set condition, is represented generally by the letter B.

Figure 2:
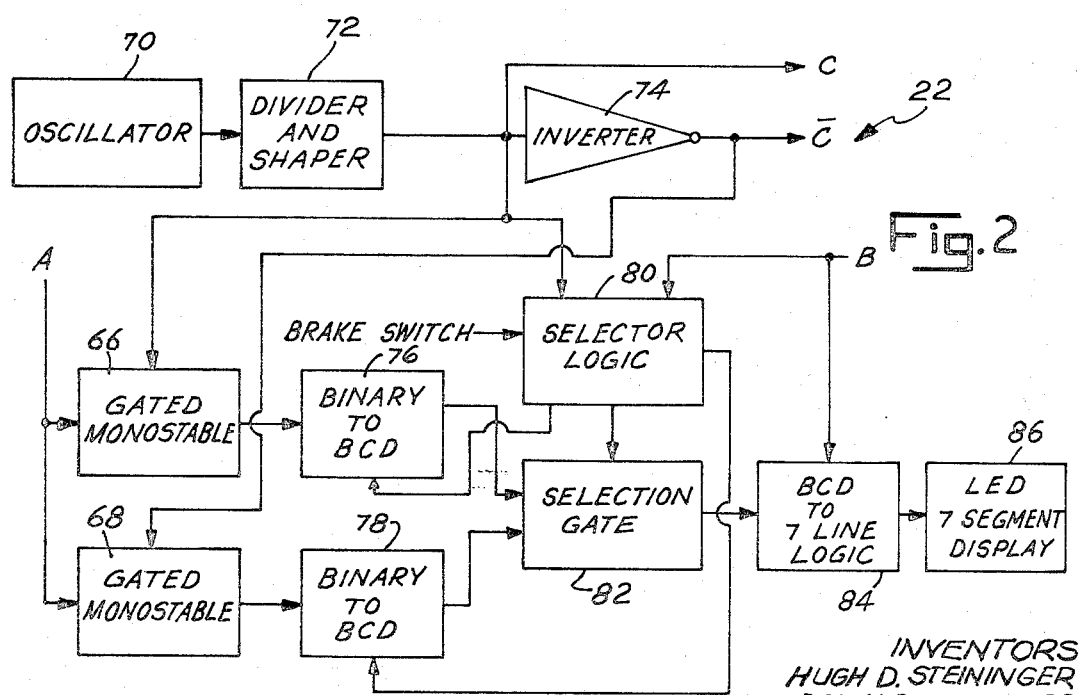
FIG. 2 is an illustrative block diagram of the velocity indicator portion of FIG. 1.

Referring now to FIG. 2, there is shown the initial speed indicator portion 22 of the vehicle initial speed and stopping distance indicator. The Doppler frequency $f_d$, which is the output of Schmitt trigger 34 shown in FIG. 3 and corresponds to letter A, is fed into gated monostables 66 and 68. Controlling the speed indication portion 22 is oscillator 70 which may be of the crystal type to give a high degree of accuracy. The output of the oscillator 70 is fed into a divider and shaper 72 to give the desired clock frequency output which is represented by the letter C. To obtain the inverse of the clock output C, inverter 74 is inserted to give a $\overline{C}$ output. One of the gated monostable 66 is triggered by the clock output C while the other gated monostable 68 is triggered by the clock output $\overline{C}$. If the clock frequency C is occurring at the rate of 1 cycle per second, then the number of pulses passed by either of the gated monostables 66 or 68 from input A would be representative of feet per second.

Assume that an automotive vehicle is moving down the road, and the automotive vehicle is equipped with the vehicle initial speed and stopping distance indicator as described in this invention. When gated monostable 66 receives a clock pulse C, an output will be fed to BCD converter 76. The pulses from the Doppler frequency $f_d$ received at input A, through gated monostable 66, and into BCD converter 76 will continue to accumulate until the clock pulse C has changed at the end of one second, or whatever units of time are being utilized. At the same instant that gated monostable 66 stops passing the Doppler frequency $f_d$ received at input A because it has lost its clock signal, the clock signal $\overline{C}$ is fed into gated monostable 68 which then allows the passing the Doppler frequency $f_d$ received at input A. The output at gated monostable 68 is fed into BCD converter 78 which begins to accumulate in the same manner as the previously mentioned converter 76. The count contained in converter 76 is the vehicle velocity and will be available for readout until another clock signal C has been received. Likewise converter 78 will retain its previous count until another clock signal $\overline{C}$ has been received. Hence, either converter 76 or converter 78 will continuously have a velocity signal available for immediate readout, the refresh rate being twice the clock frequency.

By inclusion of appropriate selector logic 80, the proper converter output can be chosen. Upon application of the vehicle brake, the signal from the brake switch actuates the selector logic 80 whereby its clock signal C can be received to instruct a selection gate 82 to pass the output of BCD converter 78. Likewise, if no clock signal ($\bar{C}$ condition) is being received coincident with the brake switch, the selector logic 80 will instruct the selection gate 82 to pass the output of BCD converter 76. The output of the selection gate 82 is changed in BCD to seven line logic decoder 84 which operates LED in a seven segment display 86. Hence, on application of the vehicle brake, a velocity readout is immediately available to the LED seven segment display 86 by a proper selection of the appropriate converter 76 or 78 in the selection 82. The initial speed indication portion 22 is reset by the same signal as the stopping distance indicator portion 28 which is represented generally by the letter B in FIG. 3. The reset B is controlled by the flip-flop 62 which is operated by the manual reset.

During a brake application on a high coefficient surface, the angle $\theta$ may change due to the pitching of the vehicle. If the angle $\theta$ changes, then the Doppler frequency $f_d$ would not be a direct function of only the vehicle velocity. Even though the error due to changes in the angle $\theta$ may be minimized by the location of the Doppler radar on the vehicle, a more accurate stopping distance indicator may be needed. FIG. 4 shows another method of obtaining the stopping distance that is not dependent upon changes in the angle $\theta$ due to pitching of the automotive vehicle or changes in slope of the road surface. Since:

2. $V_1/t = A$ where $V_1$ is the initial velocity upon applying the vehicle brakes, $t$ is the stop time and $A$ is average velocity during a braked stop, then the average velocity $A$ can be used in the well known equation:

3. $S = \frac{1}{2} At^2$ to get stopping distance $S$. Substituting for average velocity:

4. $S = (V_1/2) t$

A Doppler velocity sensor 88, which may be similar to the initial speed indicator portion 22 shown in FIGS. 1 and 2, is used to determine the velocity of the vehicle at the beginning of a brake application. This initial velocity which is in Equation 4 is memorized in the memory circuit 90. The brake switch controls the time in which the memory circuit will memorize the initial velocity $v_1$. This initial velocity $v_1$ may be printed out as previously described in FIG. 3, or by any other conventional means.

To determine the acceleration of the vehicle, the vehicle accelerometer 92, which may be similar to the one shown in U.S. Pat. No. 3,525,553, is actuated by command of the brake switch. If the automotive vehicle is being stopped on a high coefficient surface, the vehicle accelerometer 92 will give an output to level detector 94 that represents a rapid rate of deceleration. As the vehicle comes to a stop, it will tend to rock back and the vehicle accelerometer 92 will recognize this change in deceleration by a different voltage output. The level detector 94 senses this change in deceleration to give an output that indicates the deceleration is approaching zero, or the vehicle begins to accelerate, this being similar to the rock back feature of an automotive vehicle upon coming to a stop on a high coefficient surface.

Also, the brake switch sets the flip-flop 96 that controls a gate 98 from a 100 Hertz clock 100. Therefore, upon initial application of the vehicle brake, the brake switch sets flip-flop 96 which allows gate 98 to pass the clock signals to give a digital readout in the stop time digital readout 102 which corresponds to $t$ in Equation 4. One cycle from the clock 100 will correspond to 0.01 seconds. Hence, the stop time in the digital readout 102 is accurate to within one one-hundredth of a second. If the response time of the vehicle accelerometer 92 is within that time response range upon bringing the vehicle to a stop, the output of the level detector 94 resets flip-flop 96 which closes gate 98. With the closing of gate 98, the digital readout 102 no longer accumulates clock pulses from clock 100. Now by simply multiplying the stop time $t$ in digital readout 102 by one-half of the velocity $V_1$ in memory circuit 90, one can obtain the total stopping distance $S$ of the automotive vehicle. The angle $\theta$ is not a factor in this calculation. Since $V_1$ can be accurately obtained and the stop time can be accurately obtained, the total stopping distance will be an accurate figure. Though not shown in FIG. 4, the logic can be reset by a manual reset the same as FIGS. 2 and 3. Therefore, immediately before each brake application there should be no information contained within the digital readout 102 or memory circuit 90.

We claim:

1. A speed and stopping distance indicator for a vehicle comprising:

pulse generating means for generating pulses at a rate proportional to the distance traveled by the vehicle;

means for determining the distance traveled by the vehicle including means for counting the pulses generated by said pulse generating means and generating a first output signal representative of the number of pulses counted;

first display means responsive to said first output signal to display the distance traveled by the vehicle;

means for determining the instantaneous velocity of the vehicle including oscillating means generating a first signal during periodic time periods and generating a second signal during time periods when the first signal is not generated, a first counter responsive to said first signal to count said pulses during the time period that said first signal is generated, a second counter responsive to said second signal for counting said pulses during the time periods that said second signal is generated; means producing a second output signal representative of the number of pulses counted by one of said counters divided by the length of the time period to thereby determine the velocity of the vehicle during the time period that the other counter is counting pulses; and second display means responsive to said second output signal to display the velocity of the vehicle for a corresponding time period.

2. The invention of claim 1; and manually actuable reset means for resetting said distance determining means.

3. The invention of claim 1:
said pulse generating means including means for transmitting a signal and receiving reflections of said signal, coupling means for comparing said transmitted signal with reflections of said transmitted signal to produce an intermediate signal representative of the difference in frequency between the transmitted signal and the reflected signal, and signal conditioning means for charging said intermediate signal into a pulsed waveform.

4. The invention of claim 1:
said first and second display means including a light emitting matrix composed of a plurality of individually actuable segments, and coding means responsive to the value of said output signals for actuating appropriate segments of said matrix.

* * * * *